(12) United States Patent
Yu et al.

(10) Patent No.: US 8,737,432 B2
(45) Date of Patent: May 27, 2014

(54) TRANSMITTING AND RECEIVING SYSTEM TO TRANSMIT AND RECEIVE AVSB DATA, AND PROCESSING METHODS THEREOF

(75) Inventors: Jung-pil Yu, Suwon-si (KR); Jeong-hoon Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1413 days.

(21) Appl. No.: 12/023,173

(22) Filed: Jan. 31, 2008

(65) Prior Publication Data
US 2008/0187040 A1 Aug. 7, 2008

Related U.S. Application Data

(60) Provisional application No. 60/887,836, filed on Feb. 2, 2007.

(30) Foreign Application Priority Data

Oct. 15, 2007 (KR) ................ 2007-103685

(51) Int. Cl.
*H04J 3/14* (2006.01)

(52) U.S. Cl.
USPC .......................................... 370/477; 370/389

(58) Field of Classification Search
None
See application file for complete search history.

(56) References Cited

U.S. PATENT DOCUMENTS

| | | | |
|---|---|---|---|
| 5,754,605 A * | 5/1998 | Chong et al. ................ 375/368 |
| 7,420,992 B1 * | 9/2008 | Fang et al. .................. 370/477 |
| 7,711,045 B2 | 5/2010 | Park et al. |
| 7,813,426 B2 | 10/2010 | Park et al. |
| 7,844,012 B2 | 11/2010 | Park et al. |
| 7,848,462 B2 | 12/2010 | Park et al. |
| 7,873,103 B2 | 1/2011 | Park et al. |
| 8,068,565 B2 | 11/2011 | Park et al. |
| 8,238,486 B2 | 8/2012 | Park et al. |
| 8,379,714 B2 | 2/2013 | Park et al. |
| 2006/0262863 A1 * | 11/2006 | Park et al. ................ 375/240.26 |
| 2007/0014379 A1 | 1/2007 | Park et al. |
| 2007/0230460 A1 * | 10/2007 | Jeong et al. ................ 370/389 |
| 2007/0248183 A1 | 10/2007 | Park et al. |
| 2007/0290908 A1 * | 12/2007 | Esumi et al. ............... 341/143 |
| 2008/0187040 A1 * | 8/2008 | Yu et al. ................... 375/240.01 |
| 2009/0055710 A1 | 2/2009 | Park et al. |
| 2009/0122914 A1 | 5/2009 | Park et al. |
| 2009/0122915 A1 | 5/2009 | Park et al. |
| 2009/0122916 A1 | 5/2009 | Park et al. |

(Continued)

FOREIGN PATENT DOCUMENTS

| | | |
|---|---|---|
| KR | 1020060006268 A | 1/2006 |
| KR | 1020070008406 A | 1/2007 |
| WO | WO 2005/120062 A1 | 12/2005 |
| WO | WO 2006/101359 A1 | 9/2006 |

OTHER PUBLICATIONS

Search Report and Written Opinion issued in International Application No. PCT/KR2008/000636 on May 21, 2008.

(Continued)

*Primary Examiner* — Robert Wilson
(74) *Attorney, Agent, or Firm* — Sughrue Mion, PLLC

(57) ABSTRACT

A transmitting system includes an adapter unit to generate a transport stream that includes a private data field, and a stuffer unit to write advanced vestigial sideband (AVSB) data in a front part of the private data field.

17 Claims, 6 Drawing Sheets

(56) References Cited

U.S. PATENT DOCUMENTS

| | | |
|---|---|---|
| 2009/0122917 A1 | 5/2009 | Park et al. |
| 2009/0122924 A1 | 5/2009 | Park et al. |
| 2009/0129506 A1 | 5/2009 | Park et al. |
| 2009/0129507 A1 | 5/2009 | Park et al. |
| 2009/0129512 A1 | 5/2009 | Park et al. |
| 2009/0220026 A1 | 9/2009 | Park et al. |
| 2009/0225886 A1 | 9/2009 | Park et al. |

OTHER PUBLICATIONS

Communication, dated Jun. 12, 2013, issued by the Korean Intellectual Property Office in counterpart Korean Application No. 10-2007-0036436.

Communication, dated Jun. 21, 2013, issued by the Korean Intellectual Property Office in counterpart Korean Application No. 10-2009-0118756.

* cited by examiner

TRANSMITTING AND RECEIVING SYSTEM TO TRANSMIT AND RECEIVE AVSB DATA, AND PROCESSING METHODS THEREOF

CROSS-REFERENCE TO RELATED APPLICATIONS

This application claims the benefit of U.S. Provisional Application No. 60/887,836 filed on Feb. 2, 2007, and Korean Patent Application No. 2007-103685 filed in the Korean Intellectual Property Office on Oct. 15, 2007, the disclosures of which are incorporated herein by reference in their entirety.

BACKGROUND OF THE INVENTION

1. Field of the Invention

Aspects of the invention relate generally to a transmitting and receiving system to transmit and receive digital transport streams. More particularly, aspects of the invention relate to a system to transmit and receive Advanced Vestigial Sideband (AVSB) data efficiently by efficiently using a private data field, and processing methods thereof.

2. Description of the Related Art

The advent of digital technology has brought about the active use of digital processing systems in imaging applications. For example, digital TVs have become widespread. Consistent with this trend, a variety of digital broadcast standards have been proposed to enable reception and processing of digital broadcast data in homes.

For example, the terrestrial wave digital television (DTV) system that has been adopted in the U.S. is the Advanced Television Systems Committee Vestigial Sideband (ATSC-VSB) system based on a single carrier scheme, which provides a field sync signal for each unit of 312 packets of data. According to the ATSC-VSB standard, an optional field may be defined in a packet for use in transmitting additional data, which is a different type of data than the normal data that is transmitted in the ATSC-VSB system. The normal data is typically the audio and video data of a television program encoded according to the ATSC-VSB standard. However, the ATSC-VSB standard does not specifically define how to write the additional data in the optional field, and accordingly it is difficult to use the optional field efficiently.

Therefore, a method of efficiently using the optional field is required.

SUMMARY OF THE INVENTION

Several aspects and example embodiments of the invention relate to a transmitting system and a receiving system to transmit and receive advanced vestigial sideband (AVSB) data, and to various manners of writing the AVSB data in a private data field of a transport stream to efficiently use the private data field, and methods thereof for processing the transport stream.

According to an aspect of the invention, a transmitting system includes an adapter unit to generate a transport stream including a private data field, and a stuffer unit to write advanced vestigial sideband (AVSB) data in a front part of the private data field.

According to an aspect of the invention, the adapter unit generates a field in the front part of the private data field to define a region of the private data field following the field in which the AVSB data is to be written, and the stuffer unit writes the AVSB data in the region of the private data field following the field.

According to an aspect of the invention, the adapter unit divides the private data field into a plurality of private data areas, and generates a field in a front part of each of the private data areas to define a region of each of the private data areas following the field in which data is to be written.

According to an aspect of the invention, the stuffer unit writes the AVSB data in the region of a first private data area of the private data areas that is located in the front part of the private data field.

According to an aspect of the invention, the adapter unit divides the private data field into a plurality of private data areas, generates a first field in a front part of each of the private data areas to define a type of data to be written in each of the private data areas, and generates a second field in the front part of each of the private data areas before or after the first field to define a region of each of the private data areas following the first field and the second field in which the data is to be written.

According to an aspect of the invention, the stuffer unit writes turbo data in the private data field as the AVSB data, the turbo data being data that has been processed to be more robust than normal data.

According to an aspect of the invention, the transmitting system may further include a Supplementary Reference Sequence (SRS) inserting unit to write a known SRS in the private data field as AVSB data.

According to an aspect of the invention, the adapter unit generates the private data field based on information about the AVSB data provided to the adapter unit through a signaling information channel (SIC).

According to an aspect of the invention, the transmitting system may further include a randomizer unit disposed between the adapter unit and the stuffer unit to randomize the transport stream generated by the adapter unit, and a de-randomizer unit to de-randomize a transport stream including the AVSB data output from the stuffer unit.

According to an aspect of the invention, a method of processing a transport stream includes generating a transport stream including a private data field, and writing advanced vestigial sideband (AVSB) data in a front part of the private data field.

According to an aspect of the invention, the generating includes generating a field in the front part of the private data field to define a region of the private data field following the field in which the AVSB data is to be written; and writing the AVSB data in the region of the private data field following the field.

According to an aspect of the invention, the generating includes dividing the private data field into a plurality of private data areas, and generating a field in a front part of each of the private data areas to define a region of each of the private data areas following the field in which data is to be written.

According to an aspect of the invention, the writing includes writing the AVSB data in the region of a first private data area of the private data areas that is located in the front part of the private data field.

According to an aspect of the invention, the generating includes dividing the private data field into a plurality of private data areas, generating a first field in a front part of each of the private data areas to define a type of data to be written in each of the private data areas, and generating a second field in the front part of each of the private data areas before or after the first field to define a region of each of the private data areas following the first field and the second field in which the data is to be written.

According to an aspect of the invention, the writing includes writing turbo data in the private data field as the AVSB data, the turbo data being data that has been processed to be more robust than normal data.

According to an aspect of the invention, the method may further include writing a known Supplementary Reference Sequence (SRS) in the private data field as the AVSB data.

According to an aspect of the invention, the generating includes generating the private data field based on information about the AVSB data provided through a signaling information channel (SIC).

According to an aspect of the invention, a receiving system includes a receiving unit to receive a transport stream including normal data, a private data field, and advanced vestigial sideband (AVSB) data written in a front part of the private data field, a first data processing unit to process the normal data in the transport stream, and a second data processing unit to detect the AVSB data in the transport stream and process the detected AVSB data.

According to an aspect of the invention, the private data field includes a field in the front part of the private data field defining a region of the private data field following the field in which the AVSB data is written, and the second data processing unit checks the field in the front part of the private data field to determine the region of the private data field in which the AVSB data is written, and detects the AVSB data from the determined region of the private data field.

According to an aspect of the invention, the private data field includes a plurality of private data areas, each of the private data areas includes a first field in a front part of each of the private data areas defining a type of data written in each of the private data areas, and a second field in the front part of each of the private data areas before or after the first field defining a region of each of the private data areas following the first field and the second field in which the data is written; and the second data processing unit checks the first field of each of the private data areas to determine the type of the data written in each of the private data areas, checks the second field of each of the private data areas to determine the region in which the data is written in each of the private data areas, detects the AVSB data from the determined region of any of the private data areas indicated by the determined data type as having the AVSB data written therein, and processes the AVSB data with a processing suitable for a type of AVSB data indicated by the determined data type.

According to an aspect of the invention, the AVSB data includes turbo data that is data processed to be more robust than the normal data, and/or a known Supplementary Reference Sequence (SRS).

According to an aspect of the invention, a method of processing a received transport stream includes receiving a transport stream including normal data, a private data field, and advanced vestigial sideband (AVSB) data written in a front part of the private data field, processing the normal data in the transport stream, detecting the AVSB data in the transport stream, and processing the detected AVSB data.

According to an aspect of the invention, the private data field includes a field in the front part of the private data field defining a region of the private data field following the field in which the AVSB data is written, and the detecting of the AVSB data includes checking the field in the front part of the private data field to determine the region of the private data field in which the AVSB data is written, and detecting the AVSB data from the determined region of the private data field.

According to an aspect of the invention, the private data field includes a plurality of private data areas, each of the private data areas includes a first field in a front part of each of the private data areas defining a type of data written in each of the private data areas, and a second field in the front part of each of the private data areas before or after the first field defining a region of each of the private data areas following the first field and the second field in which the data is written, the detecting of the AVSB data includes checking the first field of each of the private data areas to determine the type of the data written in each of the private data areas, checking the second field of each of the private data areas to determine the region in which the data is written in each of the private data areas, and detecting the AVSB data from the determined data region of any of the private data areas indicated by the determined data type as having the AVSB data written therein, and the processing of the detected AVSB data includes processing the detected AVSB data with a processing suitable for a type of the AVSB data indicated by the determined data type.

According to an aspect of the invention, the AVSB data includes turbo data that is data processed to be more robust than the normal data, and/or a known Supplementary Reference Sequence (SRS).

In addition to the aspects and embodiments described above, further aspects and embodiments will be apparent by reference to the drawings and by study of the following description.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
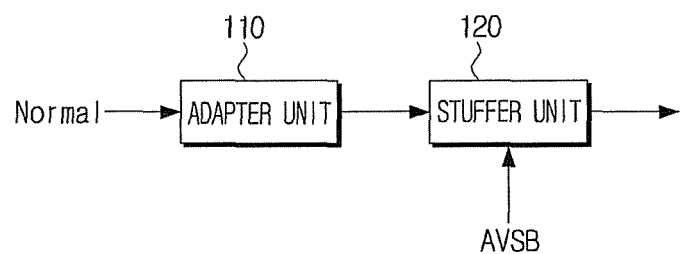
FIG. 1 is a block diagram of a transmitting system according to an aspect of the invention.

Reference will now be made in detail to embodiments of the invention, examples of which are shown in the accompanying drawings, wherein like reference numerals refer to like elements throughout. The embodiments are described below in order to explain the invention by referring to the figures.

FIG. 1 is a block diagram of a transmitting system according to an aspect of the invention. The transmitting system transmits a transport stream including normal data, and includes an adapter unit 110 and a stuffer unit 120.

The adapter unit 110 receives normal data, and generates a transport stream (TS) including the normal data. The adapter unit 110 also generates a private data field in the transport stream. The private data field is defined in the MPEG-2 standard, and is used to transmit private data that is provided by a user or a broadcast provider, and is a different type of data than the normal data. The transport stream generated by the adapter unit 110 may have the pattern shown in FIG. 2, which shows one transport packet of the transport stream.

Figure 2:
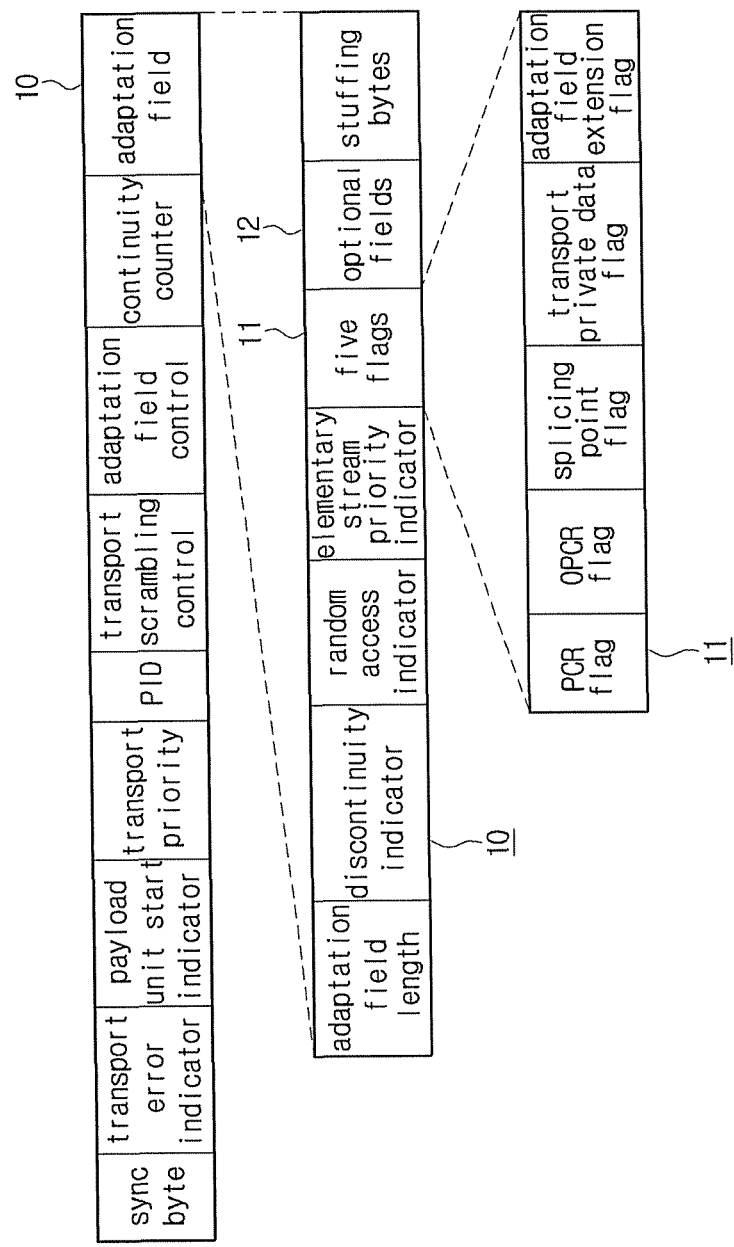
FIG. 2 shows the structure of a transport stream generated according to the MPEG-2 standard in a transmitting system according to an aspect of the invention.

Referring to FIG. 2, the transport stream generated by the adapter unit 110 may include various fields such as a sync byte, a transport error indicator, a payload unit start indicator, a transport priority, a packet identifier (PID), a transport scrambling control, an adaptation field control, a continuity counter, and an adaptation field 10. The adaptation field 10 may include an adaptation field length, a discontinuity indicator, a random access indicator, an elementary stream priority indicator, five flags 11, optional fields 12, and stuffing bytes.

The five flags 11 indicate which of the optional fields 12 are provided in the adaptation field 10, and include a Program Clock Reference (PCR) flag, an Original Program Clock Reference (OPCR) flag, a Splicing Point flag, a Transport Private Data flag, and an Adaptation Field Extension flag.

The optional fields 12 are selectively generated when corresponding ones of the five flags 11 are set to "1," rather than being provided all the time. If none of the five flags 11 are set to "1", then none of the optional fields 12 are generated. A private data field is generated when the transport private data flag of the five flags 11 is set to "1". The user may then fill the private data field with desired private data. According to an aspect of the invention, the adapter unit 110 sets the transport private data flag to "1" so that the transport stream generated by the adapter unit 110 includes the normal data and the private data field.

The stuffer unit 120 receives the transport stream generated by the adapter unit 110 and AVSB data, and writes the AVSB data in the private data field in the transport stream generated by the adapter unit 110. The AVSB data may be a turbo stream that has been processed to be more robust than a normal stream. Because the ATSC-VSB system uses a single carrier, reception is often degraded due to Doppler fading in the channel. To ensure that important data is transmitted and received correctly, the important data is additionally processed by coding and interleaving so as to be transmitted and received in the form of a robust turbo stream.

Figure 3:
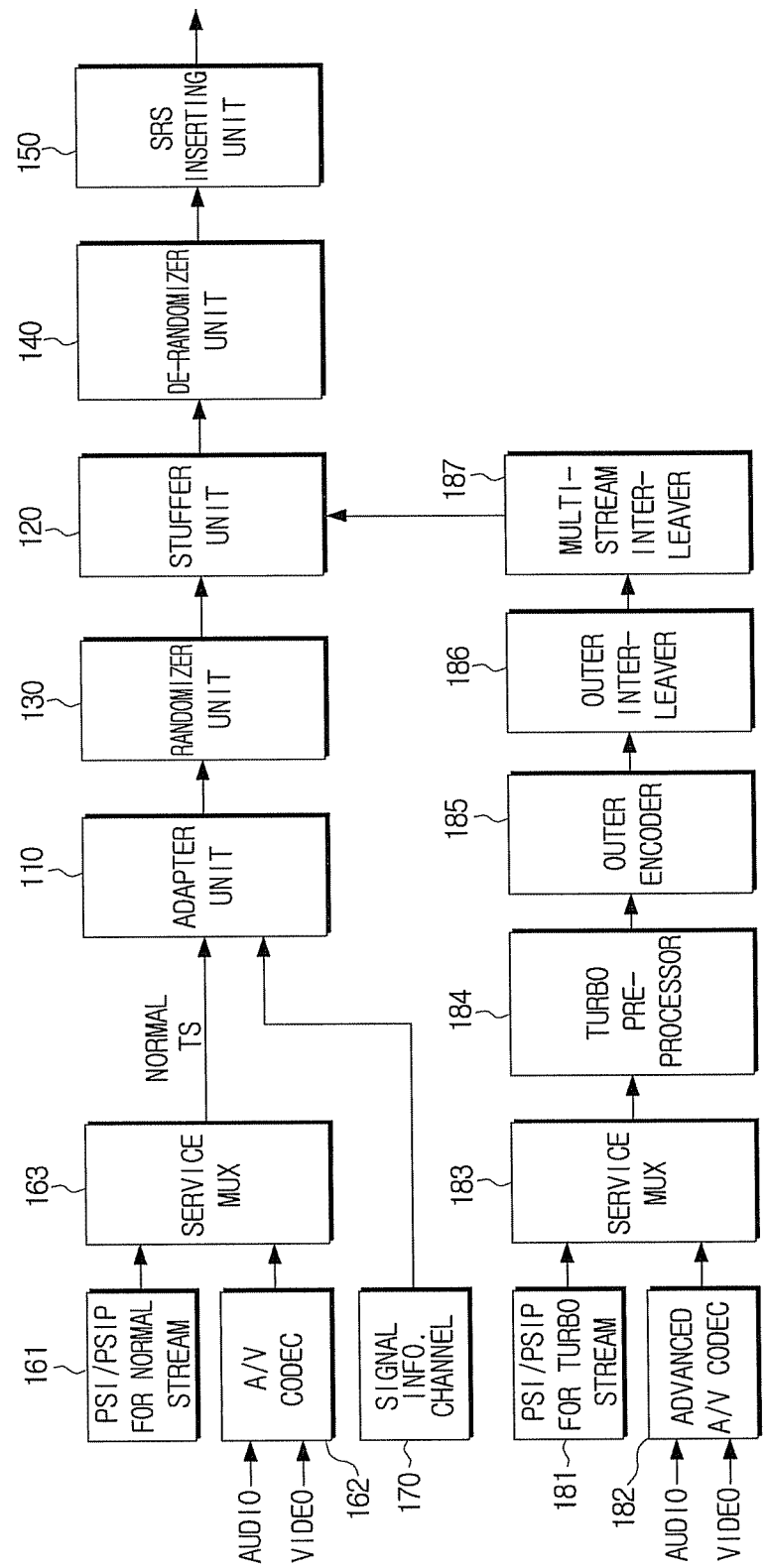
FIG. 3 is a block diagram of a transmitting system according to an aspect of the invention.

FIG. 3 is a block diagram of a structure of a transmitting system according to an aspect of the invention.

Referring to FIG. 3, the transmitting system includes the adapter unit 110 and the stuffer unit 120 described above in connection with FIG. 1, and further includes a randomizer unit 130, a de-randomizer unit 140, and a Supplementary Reference Sequence (SRS) inserting unit 150.

The adapter unit 110 receives a normal transport stream (TS) from a service multiplexer (MUX) 163. The service MUX 163 acquires PSI table and a PSIP table from a Program Specific Information/Program and System Information Protocol (PSI/PSIP) module 161 for the normal transport stream, acquires compressed audio and video data from an A/V codec 162, generates the normal transport stream by multiplexing the acquired data, and provides the adapter unit 110 with the normal transport stream.

The adapter unit 110 receives AVSB data information through a signal information channel 170. The AVSB data information includes information about the type or size of the AVSB data to be written. The adapter unit 110, upon determining that AVSB data or other private data to be transmitted exists based on the AVSB data information received through the signal information channel 170, writes the normal transport stream received from the adapter unit 110 in a payload region of transport packets, sets the private data flag to 1 and generates a private data field having an appropriate size in the transport packets, and outputs the transport packets as a transport stream to the randomizer unit 130.

The randomizer unit 130 randomizes the transport stream received from the adapter unit 110, and provides the stuffer unit 120 with the resulting randomized transport stream.

The stuffer unit 120 receives AVSB data in the form of a turbo stream from a multi-stream interleaver 187, and writes the turbo stream in the private data field of the transport packets of the randomized transport stream received from the randomizer unit 130. While FIG. 3 shows the multi-stream interleaver 187 receiving a turbo stream from a single source, it is understood that the multi-stream interleaver 187 may receive turbo streams from a plurality of sources, interleave the turbo streams, and provide the stuffer unit 120 with the resulting interleaved turbo stream.

The turbo stream is a stream of data that has been processed to be more robust than a normal stream. Specifically, incoming audio and video data are compressed in an advanced A/V codec 182, and the compressed audio and video data is provided to a service MUX 183. The service MUX 183 multiplexes a PSI table and a PSIP table for the turbo stream provided from a PSI/PSIP module 181, and the compressed video and audio data provided from the advanced A/V codec 183, to generate a turbo stream that is output to a turbo pre-processing unit 184.

The turbo pre-processing unit 184 pre-processes the turbo stream generated by the service MUX 183. An outer encoder 185 and an outer interleaver 186 perform outer encoding and outer-interleaving of the pre-processed turbo stream.

A turbo stream is output from at least one outer interleaver 186, and is interleaved into an interleaved turbo stream by the multi-stream interleaver 187, which provides the interleaved turbo stream to the stuffer unit 120.

The stuffer unit 120 writes the AVSB data in the form of the interleaved turbo stream in the front part of the private data field in the transport packets of the randomized transport stream received from the randomizer unit 130 to generate a stuffed transport stream, and provides the stuffed transport stream to the de-randomizer unit 140.

The de-randomizer unit 140 de-randomizes the stuffed transport stream received from the stuffer unit 120, and provides the resulting de-randomized transport stream to the SRS inserting unit 150.

The SRS inserting unit 150 inserts AVSB data in the form of a Supplementary Reference Sequence (SRS), which is a sequence having a known pattern, in the front part of the private data field of the transport packets of the de-randomized transport stream received from the de-randomizer unit 140. The SRS pattern is known to both the transmitting side and the receiving side. The receiving side compares the SRS in a received transport stream with the known SRS to determine a state of the channel, and also to determine a degree of channel equalization that is required.

While FIG. 3 shows all of the elements forming a single transmitting system, these elements may be grouped according to their functions. For example, the adapter unit 110, the randomizer unit 130, the stuffer unit 120, the de-randomizer unit 140, the turbo pre-processing unit 184, the outer encoder 185, the outer interleaver 186, and the multi-stream interleaver 187 may constitute an AVSB multiplexer, and the SRS inserting unit 150 may be included in an AVSB exciter. Furthermore, a byte interleaver (not shown) may be provided between the adapter unit 110 and the stuffer unit 120, and a byte de-interleaver (not shown) may be provided between the stuffer unit 120 and the SRS inserting unit 150.

Figure 4:
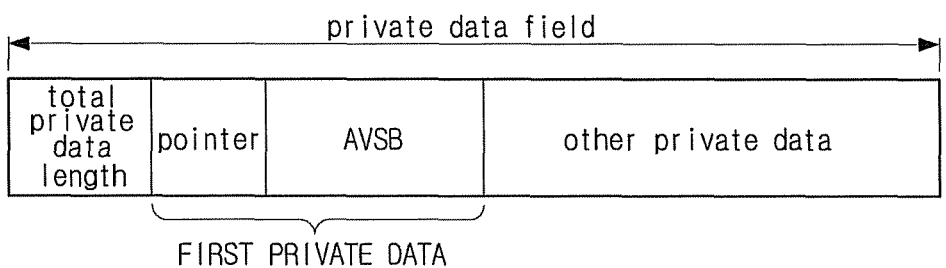
FIGS. 4 to 6 show the detailed structure of a private data field in a transport stream according to aspects of the invention.
Figure 5:
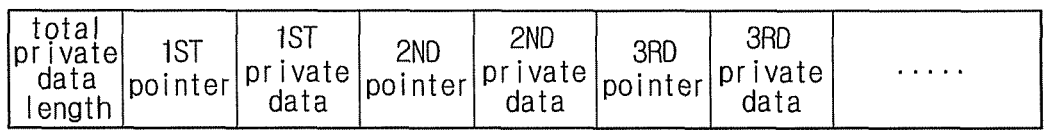
Figure 6:
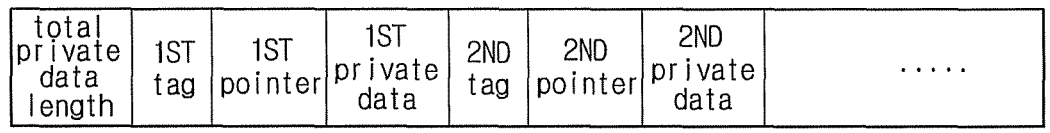

FIGS. 4 to 6 show the detailed structure of a private data field in a transport stream according to aspects of the invention. The fields shown in FIGS. 4 to 6 are named according to a standard, but these names are subject to change.

Referring to FIG. 4, a total private data length field is provided in the front part of the private data field to define a total length of the private data field. The total private data length field is defined in the MPEG-2 standard, and has a size of 8 bits.

Following the total private data length field, first private data is written in a first private data area. The first private data may be AVSB data such as a Supplementary Reference Sequence (SRS) or a turbo stream. A pointer field is provided in a front part of the first private data area to define a region in which the first private data is to be written, and the AVSB data is written after the pointer field in a remaining part of the first private data area. The size of the AVSB data, or information about the region in which the AVSB data is to be written, may be written in the pointer field to define the region in which the AVSB data is written. Other private data defined by other users may be written in a remaining part of the private data field, excluding the first private data area.

FIG. 5 shows the detailed structure of a private data field in a transport stream according to an aspect of the invention.

Referring to FIG. 5, the entire part of the private data field after the total private data length field is divided into a plurality of private data areas. A pointer (a first pointer, a second pointer, a third pointer . . . ) to define a region in which private data is to be written is disposed in a front part of each of the private data areas, and private data is written in a remaining part of each of the private data areas. AVSB data may be written in a first one of the private data areas that is located in a front part of the private data field following the total private data length field, and other private data defined by a user may be written in remaining ones of the private data areas following the first private data area.

FIG. 6 shows the detailed structure of a private data field in a transport stream according to an aspect of the invention.

Referring to FIG. 6, the entire part of the private data field after the total private data length field is divided into a plurality of private data areas. A first field disposed in a front part of each of the private data areas may contain a tag (a first tag, a second tag . . . ) to indicate a type of data to be written in each of the private data areas. A second field disposed following the first field in each of the private data areas may contain a pointer (a first pointer, a second pointer . . . ) to define a size of the data to be written in each of the private data areas. AVSB data may be written in a first one of the private data areas that is located in a front part of the private data field following the total private data length field, and other private data defined by a user may be written in remaining ones of the private data areas following the first private data area. Accordingly, the receiving side can process the data written in the private data areas appropriately based on the types of data defined by the tags in the first fields. Also, the receiving side may detect the data written in the private data areas based on the sizes of the data defined by the pointers in the second fields. Although FIG. 6 shows that the first fields contain the tags and the second fields contain the pointers, it is understood that the locations of the tags and the pointers may be exchanged.

In FIGS. 5 and 6, if the AVSB data includes both a Supplementary Reference Sequence (SRS) and a turbo stream, the SRS may be written in the first private data area, the turbo stream be written in a second one of the private data areas following the first private data area, and the other private data may be written in remaining ones of the private data areas following the second private data area. Alternatively, the turbo stream may be written in the first private data area, and the SRS may be written in the second private data area.

Figure 7:
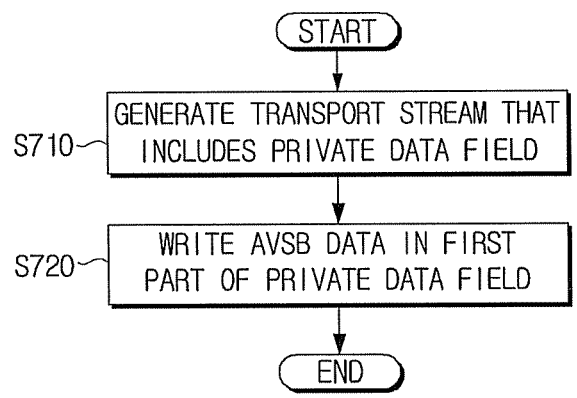
FIG. 7 is a flowchart of a method of processing a transport stream to be transmitted according to an aspect of the invention.

FIG. 7 is a flowchart of a method of processing a transport stream to be transmitted according to an aspect of the invention.

Referring to FIG. 7, in operation S710, a transport stream including a private data field is generated. In operation S720, AVSB data is written in a first part of the private data field. The AVSB data may be in the form of a turbo stream or a Supplementary Reference Sequence (SRS), and may be written in the private data field in various patterns as shown in FIGS. 4 to 6. The method of processing the transport stream shown in FIG. 7 may be performed in the transmitting system shown in FIG. 1 or FIG. 3.

Figure 8:
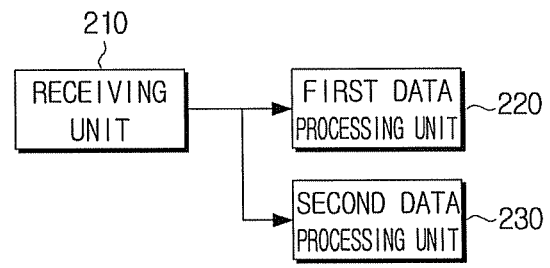
FIG. 8 is a block diagram of a receiving system according to an aspect of the invention.

FIG. 8 is a block diagram of a receiving system according to an aspect of the invention.

Referring to FIG. 8, the receiving system includes a receiving unit 210, a first data processing unit 220, and a second data processing unit 230.

The receiving unit 210 receives a transport stream that includes normal data and various private data including AVSB data. The receiving unit 210 may include an antenna (not shown) to receive a signal via an RF channel, and a decoder (not shown) to decode the received signal. The transport stream received by the receiving unit 210 includes a private data field in which the AVSB data is written in a front part of the private data field.

The first data processing unit 220 detects normal data from a payload of each of the transport packets of the transport stream and recovers the normal data. Specifically, the first data processing unit 220 may process the normal data written in the payloads of the transport packets of the received transport stream by performing Viterbi decoding, de-interleaving, Reed-Solomon (RS) decoding, and de-randomizing to recover the normal data.

The second data processing unit 230 detects the private data including the AVSB data from the private data fields of the transport packets of the received transport stream and processes the private data. Specifically, the second data processing unit 230 detects the AVSB data from the front part of the private data field. The second data processing unit 230 determines the sizes of the AVSB data from the pointers in the fields disposed in the private data fields of the transport stream, and detects the AVSB data that is written in the private data fields after the fields based on the determined sizes. The second processing unit 230 detects any other private data written in the private data fields in a similar manner.

If the detected AVSB data is a Supplementary Reference Sequence (SRS), an equalizer provided in the receiving system may perform channel equalization using the detected SRS. The equalizer may be disposed inside the first data processing unit 220 or the second data processing unit 230, or in back of the receiving unit 210. If the equalizer is provided outside the second data processing unit 230, the second data processing unit 230 may provide the equalizer with the detected SRS.

If the detected AVSB data is a turbo stream, the second data processing unit 230 performs turbo decoding to recover the turbo data. Specifically, the second data processing unit 230 detects the turbo stream from the transport stream, performs trellis-decoding, and de-interleaves and convolution-decodes the decoded turbo stream. The second data processing unit 230 then removes parities from the convolution-decoded turbo stream, and de-randomizes the parity-removed turbo stream to recover the turbo stream.

Figure 9:
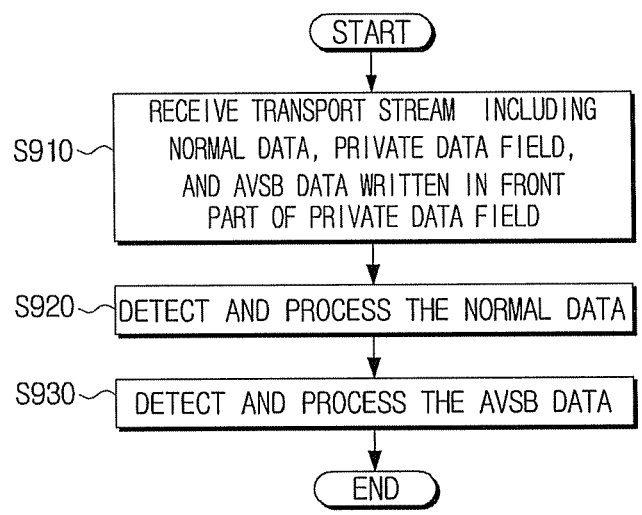
FIG. 9 is a flowchart of a method of processing a received transport stream according to an aspect of the invention.

FIG. 9 is a flowchart of a method of processing a received transport stream according to an aspect of the invention.

In operation S910, a transport stream is received. The transport stream includes normal data, a private data field, and AVSB data written in a front part of the private data field. In operations S920 and S930, the normal data and the AVSB data, respectively, are detected from the received transport stream and are processed in an appropriate manner. The private data field of the received transport stream may have any of the structures shown in FIGS. 4 to 6 in which the AVSB data is written in the front part of the private data field, and other private data is written in a remaining part of the private data field. Fields containing pointers to define the regions in which the AVSB data and the other private data are written may additionally be provided as shown in FIGS. 4-6, and fields containing tags to indicate the types of the AVSB data and the other private data may additionally be provided as shown in FIG. 6. Although FIG. 9 shows that the operation S930 of detecting and processing the AVSB data follows the operation S920 of detecting and processing the normal data, it is understood that the order of these two operations may be reversed, or that these two operations may be performed in parallel.

The receiving system checks the tags in the private data field of the received transport stream to determine the types of the private data written in the private data field. If one of the tags indicates that the AVSB data written in the private data field of the received transport stream is a turbo stream, the receiving system performs turbo decoding to recover the turbo data. If one of the tags indicates that the AVSB data written in the private data field of the received transport stream is a Supplementary Reference Sequence (SRS), the SRS is detected and may be used for channel equalization.

According to aspects of the invention, the private data field is used to transmit and receive AVSB data and other private data in the transport stream. As a result, various types of data other than normal data can be transmitted and received in the transport stream, and the digital broadcast transmitting and receiving system can be used for various purposes. Furthermore, channel equalization performance can be improved if the AVSB data is the known Supplementary Reference Sequence (SRS).

While there have been shown and described what are considered to be example embodiments of the invention, it will be understood by those skilled in the art and as technology develops that various changes and modifications may be made therein, and equivalents may be substituted for elements thereof, without departing from the true scope of the invention. Many modifications, permutations, additions, and sub-combinations may be made to adapt the teachings of the invention to a particular situation without departing from the scope thereof. For example, a transport stream including normal data may be provided with a private data field. AVSB data may be written in a front part of the private data field, and other private data may be written in a remaining part of the private field. The AVSB data may be turbo data that is data processed to be more robust than the normal data, and/or a known Supplementary Reference Sequence (SRS) used for channel equalization. A field may be provided in a front part of the private data field to define a region of the private data field following the field in which the AVSB data is to be written. Alternatively, the private data field may be divided into a plurality of private data areas, and a field may be provided in a front part of each of the private data areas to define a region of each of the private data areas following the field in which data is to be written. Alternatively, a first field may be provided in a front part of each of the private data areas to define a type of data to be written in each of the private data areas, and a second field may be provided in a front part of each of the private data areas before or after the first field to define a region of each of the private data areas following the first field and the second field in which data is to be written. AVSB data may be written in a first private data area of the private data areas that is located in the front part of the private data field, and other private data may be written in remaining ones of the private data areas following the first private data area. The AVSB data may be the turbo data or the known SRS. Alternatively, the turbo data may be written in the first private data area, the known SRS may be written in a second private data area of the private data areas following the first private data area, and other private data may be written in remaining ones of the private data areas following the second private data area. The positions of the turbo data and the known SRS may be reversed, so that the known SRS is written in the first private data area, and the turbo data us written in the second private data area. Accordingly, it is intended that the invention not be limited to the various example embodiments disclosed herein, but that the invention include all embodiments falling within the scope of the claims and their equivalents.

What is claimed is:

1. A transmitting system comprising:
a stuffer unit which generates a transport stream by multiplexing normal data and additional data
wherein the additional data is pre-processed by encoding and interleaving of the additional data before the additional data is multiplexed with the normal data, and
wherein the transport stream further comprises a known signal pattern which is used by a receiving system for channel equalization, and
wherein the known signal pattern is known to both the transmitting system and the receiving system.

2. The transmitting system of claim 1, further comprising a pre-processor which performs the pre-processing.

3. The transmitting system of claim 1, wherein the area contains at least one of information about a size of the additional data and information about a position of the additional data.

4. The transmitting system of claim 1, further comprising:
a randomizer unit which randomizes the normal data which is output by the adapter unit and in which the area is provided;
a derandomizer which derandomizes the normal data which is output by the stuffer unit and in which the additional data is inserted; and
a supplementary reference signal (SRS) inserting unit which inserts the known signal pattern in the area.

5. The transmitting system of claim 1, wherein the known signal pattern is different from a field sync and a segment sync.

6. A method of processing a transport stream of a transmitting system, the method comprising:
generating, by a stuffer unit of the transmitter, a transport stream by multiplexing normal data and additional data wherein the additional data is pre-processed by encoding and interleaving of the additional data before the additional data is multiplexed with the normal data by the stuffer unit, wherein the transport stream further comprises a known signal pattern which is used by a receiving system for channel equalization, and wherein the known signal pattern is known to both the transmitting system and the receiving system.

7. The method of claim 6, further comprising processing robustly the additional data using a compression scheme different from a compression scheme for the normal data before the additional data is inserted in the area.

8. The method of claim 6, wherein the area contains at least one of information about a size of the additional data and information about a position of the additional data.

9. The method of claim 6, wherein the known signal pattern is different from a field sync and a segment sync.

10. A receiving system for receiving a transport stream from a transmitting system, the receiving system comprising:

a receiving unit which receives the transport stream comprising normal data, additional data and a known signal pattern; and a data processing unit which processes the additional data, wherein, before the transport stream is received at the receiving unit, the additional data is pre-processed by encoding and interleaving of the additional data before the additional data is multiplexed with the normal data, wherein the additional data and the known signal pattern are inserted in an area, provided in a plurality of packets which contain the normal data, by the transmitting system, wherein the known signal pattern is used by the data processing unit for channel equalization, and wherein the known signal pattern is known to both the transmitting system and the receiving system.

11. The receiving system of claim 10, wherein the area contains at least one of information about a size of the additional data and information about a position of the additional data.

12. The receiving system of claim 10, wherein the additional data is processed robustly than the normal data by the transmitting system using a compression scheme different from a compression scheme for the normal data before the transport stream is received at the receiving unit.

13. The receiving system of claim 10, wherein the known signal pattern is different from a field sync and a segment sync.

14. A method of a receiving system for processing a transport stream received from a transmitting system, the method comprising:

receiving, by a receiving unit of the receiving system, the transport stream comprising normal data, additional data and a known signal pattern; and processing the additional data in the transport stream, by a data processing unit, wherein, before the transport stream is received at the receiving unit, the additional data is pre-processed by encoding and interleaving of the additional data before the additional data is added to the normal data, wherein the additional data and the known signal pattern are inserted in an area, provided in a plurality of packets which contain the normal data, by the transmitting system, wherein the known signal pattern is used by the data processing unit for channel equalization, and wherein the known signal pattern is known to both the transmitting system and the receiving system.

15. The method of claim 14, wherein the area contains at least one of information about a size of the additional data and information about a position of the additional data.

16. The method of claim 14, wherein the additional data is processed more robustly than the normal data by the transmitting system using a compression scheme different from a compression scheme for the normal data before the transport stream is received at the receiving unit.

17. The method of claim 14, wherein the known signal pattern is different from a field sync and a segment sync.

* * * * *